Patented May 19, 1936

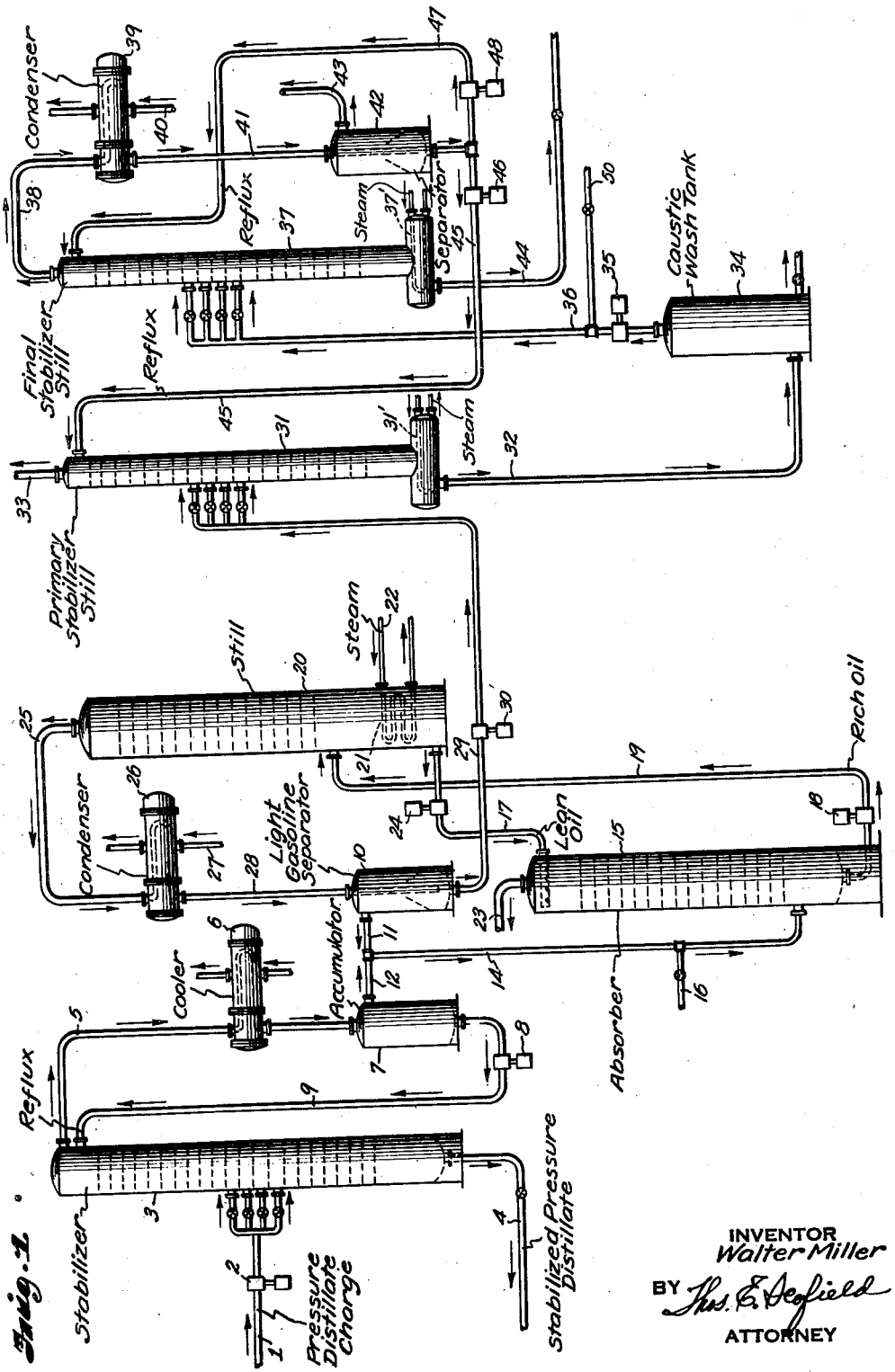

2,041,364

UNITED STATES PATENT OFFICE 2,041,364

METHOD FOR REMOVING CORROSIVE SUBSTANCES FROM HYDROCARBONS

Walter Miller, Ponca City, Okla., assignor to Continental Oil Company, Ponca City, Okla., a corporation of Delaware Application May 7, 1934, Serial No. 724,331

3 Claims. (Cl. 196—24)

My invention relates to a method and apparatus for removing corrosive substances from hydrocarbons and more particularly to a method and apparatus for removing corrosive mercaptans from gases and liquids resulting in the refining of petroleum.

Many crude oils occurring in the United States contain sulphur and sulphur compounds. In some instances, the percentage of sulphur in crude oil may run as high as four percent by weight or more. This sulphur occurs in the form of hydrogen sulphide, mercaptans, sulphides, disulphides, ring type sulphur compounds, and free sulphur. The hydrogen sulphide and low molecular weight mercaptans in crude oil or in products resulting from the processing of crude oils, are corrosive in their nature. Then, too, in cracking the high boiling material resulting from topping crude oil or in cracking any sulphur containing hydrocarbon stock, there is considerable hydrogen sulphide and mercaptans formed by the conversion of other sulphur compounds which may be present in the heavy topped products.

Hydrocarbon gases resulting from petroleum oil refining are suitable fuel for city gas mains and generally desirable for fuel consumption. A gas company selling gas obtained from oil refineries will usually process it to remove hydrogen sulphide if the gas contains an excessive amount, before it is delivered to the consumer. There are a number of methods known for removing hydrogen sulphide from gas. Among these are the bog ore treatment and alkali washing. The methods used for removing hydrogen sulphide do not, as a rule, remove corrosive mercaptans. Those methods which do remove corrosive mercaptans are costly in their operation. Gas distributing companies which produce gas from oil refineries often base the purchase price on the hydrogen sulphide content and/or the corrosive mercaptan content. There may be a very definite prescribed maximum allowable percentage of either the hydrogen sulphide or mercaptan content in gases which are received by gas companies. The purchase price per unit of volume of gas may decrease rapidly as the hydrogen sulphide and/or corrosive sulphur content increases. It is, therefore, desirable for oil refining companies to be able to supply a gas to gas distributing companies having a low content of corrosive mercaptans and/or hydrogen sulphide. Small percentages or traces of mercaptans are permissible.

Since hydrogen sulphide may be removed comparatively easily with little expense by the gas company the price reduction for hydrogen sulphide content is not as great as that for the presence of corrosive mercaptans. The mercaptans in the gas are not removed by ordinary bog ore treatment, which is one of the cheapest and most commonly employed methods used for removing hydrogen sulphide. If corrosive mercaptans are allowed to remain in the gas, they have a very deleterious action upon household appliances using gas, and particularly on copper and brass household equipment, valves, control instruments, fittings and the like.

One object of my invention is to provide a method and apparatus for the removal of corrosive mercaptans from hydrocarbon gases prior to their delivery into any system containing or equipped with easily corroded equipment.

Another object of my invention is to provide a method and apparatus for removing corrosive mercaptans from the light, low molecular weight hydrocarbon liquids which at times are used for generating gas or enriching other low thermal value gases.

Still another object of my invention is to provide a method of removing corrosive mercaptans without the additional expense of removing hydrogen sulphide which may be removed by cheaper methods.

Another object of my invention is to provide a method of removing mercaptans in which hydrogen sulphide may be removed or partially removed without the aid of chemical treatment.

Other and further objects of my invention will appear from the following description.

The accompanying figure is a diagrammatic view of one form of apparatus capable of carrying out the method of my invention.

In general, my invention contemplates concentrating corrosive mercaptans from a large volume of gases into a liquid product substantially free of hydrogen sulphide. The concentrating steps of my process may be carried out by absorption and fractionation. The concentrated liquid containing the corrosive mercaptans is then treated with an alkaline or other mercaptan removing agent. The mercaptan free liquids are then used as enriching oils or converted into gases and used for enriching purposes.

More particularly referring now to the drawing, a pressure distillate obtained from cracking units is charged through line 1 by pump 2 to a stabilizing tower 3. The stabilized pressure distillate is withdrawn from the tower through line 4. The gas withdrawn from the stabilizer through line 5 may consist, for example, of methane, ethane, propane, smaller amounts of butane, pentane and heavier hydrocarbons, hydrogen sulphide, and low boiling mercaptans. It is understood that isomers of these hydrocarbon compounds and other unsaturated derivatives of each, boiling at similar temperatures, will be found. The gas and/or vapors are cooled in cooler 6 and passed into accumulator 7 from which reflux is taken and pumped by pump 8 through line 9. Gas from separator 10 passes through line 11 and joins gas from accumulator 7 coming through line 12 and the combined gases pass through line 14 to the absorber tower 15. Other gaseous hydrocarbons containing hydrogen sulphide and/or mercaptans may be charged into the line 14 going to the absorber 15 through line 16. Lean absorber oil enters the absorber 15 through line 17. The enriched absorber oil is pumped by pump 18 through line 19 to a steam still 20 which is provided with a heating coil 21 supplied by steam through line 22. This absorption step is operated to remove substantially all gaseous mercaptans and give a lean mercaptan free gas through line 23. The gas being removed from line 23 will consist of methane, ethane, small amounts of propane and butane, and hydrogen sulphide. The absorber 15 is controlled to obtain substantially all of the corrosive mercaptans in the rich oil. The enriched oil is stripped of all the absorbed materials in still 20, the lean oil being pumped from the still by pump 24 through line 17 to the absorber. The vapors and gases stripped from the rich oil in still 20 are withdrawn from the still through line 25 and passed through condenser 26 which is supplied with cooling water through line 27. The volatile gases and lighter ends which are not condensed in condenser 26 are withdrawn from separator 10 into which the liquid products of the cooling step are discharged, through line 11. The less volatile liquefied fractions of the gaseous hydrocarbons and all of the mercaptans are removed from the separator 10 through line 29 and pumped by pump 30 to a primary stabilizer 31 in which reboiling and fractionation takes place, heat being supplied through any suitable means such as a steam coil. Due to the differences in boiling points between hydrogen sulphide and corrosive mercaptans, it is a simple matter to obtain by fractionation in primary stabilizer 31 a liquid containing the mercaptans and free of hydrogen sulphide. This liquid is withdrawn from the primary stabilizer through line 32 in the form of a light gasoline-like material. The gas withdrawn from the primary stabilizer through line 33 will contain methane, ethane, small amounts of propane and the like, and such hydrogen sulphide as was not removed in separator 10. It will be practically mercaptan-free, the mercaptans having been separated by fractionation and being contained in the light, low boiling gasoline withdrawn from the stabilizer through line 32. This light gasoline is then treated by a treatment designed to remove mercaptans. It may be passed through a body of caustic contained in caustic wash tank 34 in which the mercaptans would be removed without spending caustic for the removal of hydrogen sulphide. It will be obvious that, if hydrogen sulphide were present in the liquid being treated, caustic would be spent in removing hydrogen sulphide which can be more economically removed by other methods.

As pointed out above, I desire to selectively remove the mercaptans in an economical manner. The light gasoline, free of mercaptans, is then pumped by pump 35 through line 36 to the final stabilizer 37 in which fractionation takes place, heat for reboiling being provided by coil 37'. The gas and vapors removed from the final stabilizer through line 38 are condensed in condenser 39 which is supplied with cooling water through line 40 and passed through line 41 to a separator 42. The more volatile hydrocarbons are removed from the separator through line 43. This gas contains the balance of the methane, ethane, propane, and like boiling hydrocarbons and iso-butanes. This gas will be hydrogen sulphide and mercaptan free. Corrosive mercaptan-free liquid may be withdrawn through line 50 without going to stabilizer 37, if final stabilization of liquid is not required.

The stabilizing tower 37 is so controlled as to give a light gasoline of predetermined vapor pressure. This is withdrawn from the tower 37 through line 44 and may be used as an enriching oil or as casinghead gasoline for gasoline blending. The less volatile hydrocarbons condensing in condenser 39 accumulate in separator 42 and the liquid is used as reflux being pumped from separator 42 through line 45 by pump 46 and line 47 by pump 48 as reflux for stabilizers 31 and 37 respectively. This can be readily seen by reference to the drawing. The total liquid in 42 may be vaporized and mixed with other mercaptan-free gas.

If desired, the gases from lines 23, 33, and 43, and/or liquid from line 50, may be combined as a salable gas, substantially free of mercaptans, though containing hydrogen sulphide. If a hydrogen sulphide free, mercaptan free gas be desired, the gas from line 43, or liquid from line 50, may be held separate from the gases from lines 23 and 33.

It will be observed that while I have employed a caustic wash for the removal of mercaptans, any of the known methods for removing mercaptans from hydrocarbon liquids may be employed without departing from my invention. It will also be apparent that the caustic consumption in the caustic wash tank 34 will be only that required for the removal of corrosive mercaptans.

Due to the very high vapor pressure of the product being treated in my invention, I prefer to use pressure throughout the entire operation. My invention is not limited to any degree of pressure in any of the particular steps, since variations in the types of materials being handled will determine the pressures and temperatures to be carried at the various steps of my process. For example, absorption tower 15 may be operated at pressures as low as 25 pounds per square inch. Higher pressures as a rule are employed and may be as high as 500 pounds per square inch or more. Similarly the stabilizers and stills may be operated at pressures as low as 25 pounds per square inch. As a rule, higher pressures are desirable and more economical. Pressures as high as 1000 pounds per square inch or more may be employed in the stabilization steps as practiced in stabilizer stills 31 and 37.

As a particular example of the operation of my process, I have taken the gas from a refinery processing West Texas crude and producing approximately 3.5 million cubic feet of gas per day. The gas was comprised by fresh gas from Dubbs and Cross cracking plant operations. Gas was also taken from a debutanizer operation, from a steam still recycling step, from crude oil distillation and storage tanks.

The composite gas had the following average analysis:

Rich gas

| | Percent |
|---|---|
| Methane | 35.75 |
| Ethane | 21.50 |
| Propane | 22.10 |
| Butane | 13.51 |
| Pentane and heavier | 3.34 |
| Hydrogen sulphide | 3.80 |

Corrosive (mercaptans), 10 mg./cu. ft.

The absorber was operated at 53 pounds per square inch pressure, and employed 65 gallons per minute of 70° F., 35 A. P. I. gravity absorber oil. The residue gas from the absorber had the following composition:

Lean gas

| | Percent |
|---|---|
| Methane | 45.80 |
| Ethane | 24.15 |
| Propane | 21.65 |
| Butane | 1.65 |
| Pentane and heavier | Trace |
| Hydrogen sulphide | 4.90 |

Corrosives (mercaptans), 2.5 mg./cu. ft.

It is to be noted that a more efficient operation in the absorption step will reduce the mercaptan content of the lean gas.

The distillation of the rich oil in still 20, taken from the absorber 15, which distillation was carried on at 65 pounds per square inch pressure, yielded 600 barrels per day of a product having the following approximate composition by volume:

Liquid absorbed

| | Percent |
|---|---|
| Propane | 15.60 |
| Iso-butane | 13.49 |
| Normal butane | 38.30 |
| Pentane | 20.36 |
| Hexane and heavier | 12.25 |

This liquid contained all of the corrosive mercaptans absorbed in the rich oil and a small amount of hydrogen sulphide. This liquid which corresponds substantially to the liquid being withdrawn from separator 10 by pump 30 is stabilized in the primary stabilizer 31 to remove the hydrogen sulphide in the gas, the stabilizing step being so carried on as to leave the organic corrosive mercaptans in the liquid. I accomplish this under 225 pounds pressure using a temperature of 220° F. as the bottom temperature in the stabilizer 31 and a final gas separation temperature at the stabilizer top of 90° F. The average yield of liquid withdrawn from the stabilizer 31 was 450 barrels a day. The gas withdrawn from the stabilizer 31 through line 33 was about 200,000 cubic feet per day and had the following approximate composition:

Gas

| | Percent |
|---|---|
| Methane | 2.61 |
| Hydrogen sulphide | 7.89 |
| Ethane | 25.34 |
| Propane | 64.16 |
| Butane | .00 |
| Corrosives (mercaptans) | None |

The liquid withdrawn through line 32 had the following approximate composition:

Liquid

| | Percent |
|---|---|
| Methane | .00 |
| Ethane | .00 |
| Propane | .00 |
| Iso-butane | 12.54 |
| Normal butane | 7.61 |
| Pentane | 41.15 |
| Hexane and heavier | 22.55 |
| | 16.10 |

This liquid also contained all of the corrosive mercaptans not escaping with the gas through line 23. This liquid was then given a caustic wash in tank 34. The liquid was then given a final stabilization in still 37. The final stabilization operation was carried out at pressures from 135 pounds per square inch to 175 pounds per square inch using bottom temperatures from 210–220° F. and a final gas separation temperature at top of still of 90° F. The quantity of gas removed from separator 43 was about 100,000 cubic feet, having the following approximate analysis:

| | Percent |
|---|---|
| Methane | .00 |
| Ethane | .00 |
| Hydrogen sulphide | .00 |
| Propane | 62.75 |
| Iso-butane | 13.80 |
| Butane and heavier | 23.45 |
| Corrosives (mercaptans) | Trace |

The liquid withdrawn from the stabilizer still 37 through line 44 was substantially propane free and having sufficient iso-butane and normal butane removed to give the desired vapor pressure. The final liquid contained little or no corrosive mercaptans and is a desirable enriching oil capable of being used to enrich low B. t. u. gas without encountering objectionable mercaptan corrosion.

It will be seen that I have accomplished the objects of my invention. I am enabled to remove a substantial amount of mercaptans from heavier gases by absorption and to concentrate the mercaptans in liquid which may be economically treated for mercaptan removal, which liquid may be subsequently used for generating or enriching low B. t. u. value gases. I am enabled to remove corrosive mercaptans without the necessity of using a large quantity of alkali for the removal of hydrogen sulphide which may be more economically removed by other methods. I am enabled to separate hydrogen sulphide from normally gaseous hydrocarbons without the aid of chemical treatment. I am enabled by my process to deliver refinery gases to a purchasing gas distributing company in a more salable and less objectionable form.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a method of removing sulphur compounds from cracked hydrocarbons, subjecting the hydrocarbons to an absorption step in which the hydrocarbons are contacted with an absorption medium, distilling the absorbed hydrocarbons and sulphur compounds from the absorption medium, subjecting the gases and vapors from the distillation step to fractionation, controlling the fractionation step so that hydrogen sulphide and lighter hydrocarbons are in a gaseous state while the heavier sulphur compounds and heavy hydrocarbons are in a liquid state, withdrawing the hydrogen sulphide and lighter hydrocarbons from the fractionating zone, separately withdrawing the heavier hydrocarbons containing heavier sulphur compounds from the fractionating zone, subjecting the heavier hydrocarbons to a sulphur removing treatment, stabilizing the thus treated heavier hydrocarbons and recovering a rich hydrocarbon gas and a light hydrocarbon liquid from the stabilizing zone.

2. In a method of removing sulphur compounds from cracked hydrocarbons, subjecting the hydrocarbons to an absorption step in which the hydrocarbons are contacted with an absorption medium, controlling the absorption step so that most of the hydrogen sulphide is not absorbed, distilling the absorbed hydrocarbons and sulphur compounds from the absorption medium, subjecting the gases and vapors from the distillation step to fractionation, controlling the fractionation step so that hydrogen sulphide and lighter hydrocarbons are in a gaseous state while the heavier sulphur compounds and heavier hydrocarbons are in a liquid state, withdrawing the hydrogen sulphide and lighter hydrocarbons from the fractionating zone, separately withdrawing the heavier hydrocarbons containing the heavier sulphur compounds from the fractionating zone, subjecting the heavier hydrocarbons to a sulphur removing treatment, stabilizing the thus treated heavier hydrocarbons and recovering a rich hydrocarbon gas and a light hydrocarbon liquid from the stabilizing zone.

3. In a method of removing sulphur compounds from hydrocarbons, subjecting the hydrocarbons to an absorption step in which the hydrocarbons are contacted with an absorption medium, controlling the absorption step so that most of the hydrogen sulphide is not absorbed, distilling the absorbed hydrocarbons and sulphur compounds from the absorption medium, subjecting the gases and vapors from the distillation step to fractionation, controlling the fractionation step so that hydrogen sulphide and lighter hydrocarbons are in a gaseous state while the heavier sulphur compounds and heavier hydrocarbons are in a liquid state, withdrawing the hydrogen sulphide and lighter hydrocarbons from the fractionating zone, separately withdrawing the heavier hydrocarbons containing the heavier sulphur compounds from the fractionating zone, subjecting the heavier hydrocarbons to a sweetening treatment, stabilizing the thus treated heavier hydrocarbons and recovering a rich hydrocarbon gas and a light hydrocarbon liquid from the stabilizing zone.

WALTER MILLER.